United States Patent

[11] 3,612,618

| [72] | Inventor | Kenneth B. Swanson |
| --- | --- | --- |
| | | Bannister, Mich. |
| [21] | Appl. No. | 874,484 |
| [22] | Filed | Nov. 6, 1969 |
| [45] | Patented | Oct. 12, 1971 |
| [73] | Assignee | Midland-Ross Corporation |
| | | Cleveland, Ohio |

[54] PRESSURE-SENSITIVE METERING VALVE
10 Claims, 3 Drawing Figs.

[52] U.S. Cl.................................................. 303/6 C,
60/54.5 E, 137/493.6, 137/505.42, 137/505.43,
137/512.2, 137/512.3, 188/349
[51] Int. Cl............................................................ B60t 8/26,
B60t 11/34
[50] Field of Search............................................137/505.41,
505.42, 505.43, 493.1, 493.4, 493.8, 512.2, 512.3,
505.13, 493.6; 60/54.5 E; 303/6 C, 22, 22 A;
188/152.11

[56] References Cited
UNITED STATES PATENTS

| 3,162,048 | 12/1964 | Albertson et al. | 137/505.13 X |
| --- | --- | --- | --- |
| 3,375,852 | 4/1968 | Milster | 303/6 (C) X |
| 3,385,637 | 5/1968 | Kersting | 303/6 (C) |
| 3,462,201 | 8/1969 | Lewis et al. | 303/6 (C) |
| 3,473,849 | 10/1969 | Smith et al. | 303/6 (C) |
| 3,526,437 | 9/1970 | Lewis | 303/6 (C) |

*Primary Examiner*—Milton Buchler
*Assistant Examiner*—John J. McLaughlin
*Attorney*—Malcolm R. McKinnon

ABSTRACT: A pressure-sensitive metering valve for use in hydraulic brake systems of automotive vehicles wherein the front wheels of the vehicle are provided with disc-type brakes and the rear wheels of the vehicle are provided with drum-type brakes, the metering valve being solely pressure sensitive and being effective to establish a fluid pressure differential between the disc brakes and the drum brakes, to withhold the application of fluid pressure to the disc brakes over a predetermined range of fluid pressure and thereafter being effective to reduce the pressure differential at a linear rate over a second range of fluid pressure independently of the rate of manual application of the brakes.

INVENTOR
KENNETH B. SWANSON

BY
Miller, Morriss, Pappas & McLeod
ATTORNEYS

INVENTOR
KENNETH B. SWANSON

BY
Miller, Morriss, Pappas + McLeod
ATTORNEYS

PRESSURE-SENSITIVE METERING VALVE

BRIEF SUMMARY OF THE INVENTION

This invention relates to hydraulic brake systems for automotive vehicles and, more particularly, to an improved pressure-sensitive metering valve particularly adapted for use in automotive hydraulic brake systems wherein the front wheels of the vehicle are provided with disc-type brakes while the rear wheels of the vehicle are provided with drum-type brakes. As is well known in the art, when the front wheels of an automotive vehicle are provided with disc-type brakes and the rear wheels of the vehicle are provided with drum-type brakes, the disc-type brakes require only a relatively small amount of pressure from the master cylinder to effect actuation thereof sufficient to produce a braking action whereas the drum-type brakes, which utilize brake shoes and relatively heavy return springs require considerably more pressure to effect sufficient actuation to produce braking action. Heretofore, various metering valves have been devised for use in automotive vehicle hydraulic brake systems having disc-type brakes on the front wheels and drum type brakes on the rear wheels, which valves are effective to withhold delivery of fluid pressure from the master cylinder to the disc-type brakes while fluid pressure from the master cylinder is initially applied to the drum brakes, a gradual reduction in the pressure differential between the two sets of brakes being effected as the pedal effort is increased until the hydraulic pressure is equalized at both the drum and disc brakes at some predetermined pressure.

Prior metering devices of the indicated character have been subject to the deficiency that they are difficult to control over broad performance ranges, have been very sensitive to the rate of application of the manual pedal effort, have not been effective to equalize the pressures between the disc and drum brakes at a linear rate and, in some instances, prior devices which sense displacement rather than pressure have not been readily adaptable to vary the rate of reduction of the pressure differential between the disc and drum brakes because the rate of reduction tends to vary when the displacement of the fluid varies.

An object of the present invention is to overcome disadvantages in prior metering valves of the indicated character and to provide an improved pressure-sensitive metering valve which is particularly adapted for use in automotive vehicle hydraulic brake systems having disc brakes on the front wheels of the vehicle and drum brakes on the rear wheels of the vehicle and which is effective to establish a fluid pressure differential between the disc brakes and the drum brakes, to withhold the application of fluid pressure to the disc brakes over a first predetermined range of pressure and thereafter being effective to reduce the pressure differential at a linear rate over a second range of fluid pressure independently of the rate of manual application of the brakes.

Another object of the invention is to provide an improved pressure-sensitive metering valve incorporating improved means for controlling the braking action of an automotive vehicle equipped with disc brakes on the front wheels thereof and drum brakes on the rear wheels thereof.

Another object of the invention is to provide an improved pressure-sensitive metering valve which permits the initial actuation of a disc-type brake and thereafter is effective to establish a fluid pressure differential between the front and rear brakes of an automotive vehicle effective to delay the braking action of the front wheel brakes until the rear wheel brakes are actuated.

Another object of the invention is to provide an improved pressure-sensitive metering valve incorporating improved means for statically sealing various components thereof.

Another object of the invention is to provide an improved pressure-sensitive metering valve incorporating improved means providing improved control over the fluid pressure applied to hydraulically actuated brakes on an automotive vehicle.

Another object of the invention is to provide an improved pressure-sensitive metering valve that is economical and commercially feasible to manufacture, durable, efficient and reliable in operation.

Another object of the invention is to provide an improved pressure-sensitive metering valve which may be readily varied to meet the requirements of various vehicle brake systems.

The above as well as other objects and advantages of the present invention will become apparent from the following description, the appended claims and the accompanying drawing.

DETAILED DESCRIPTION

Figure 1:
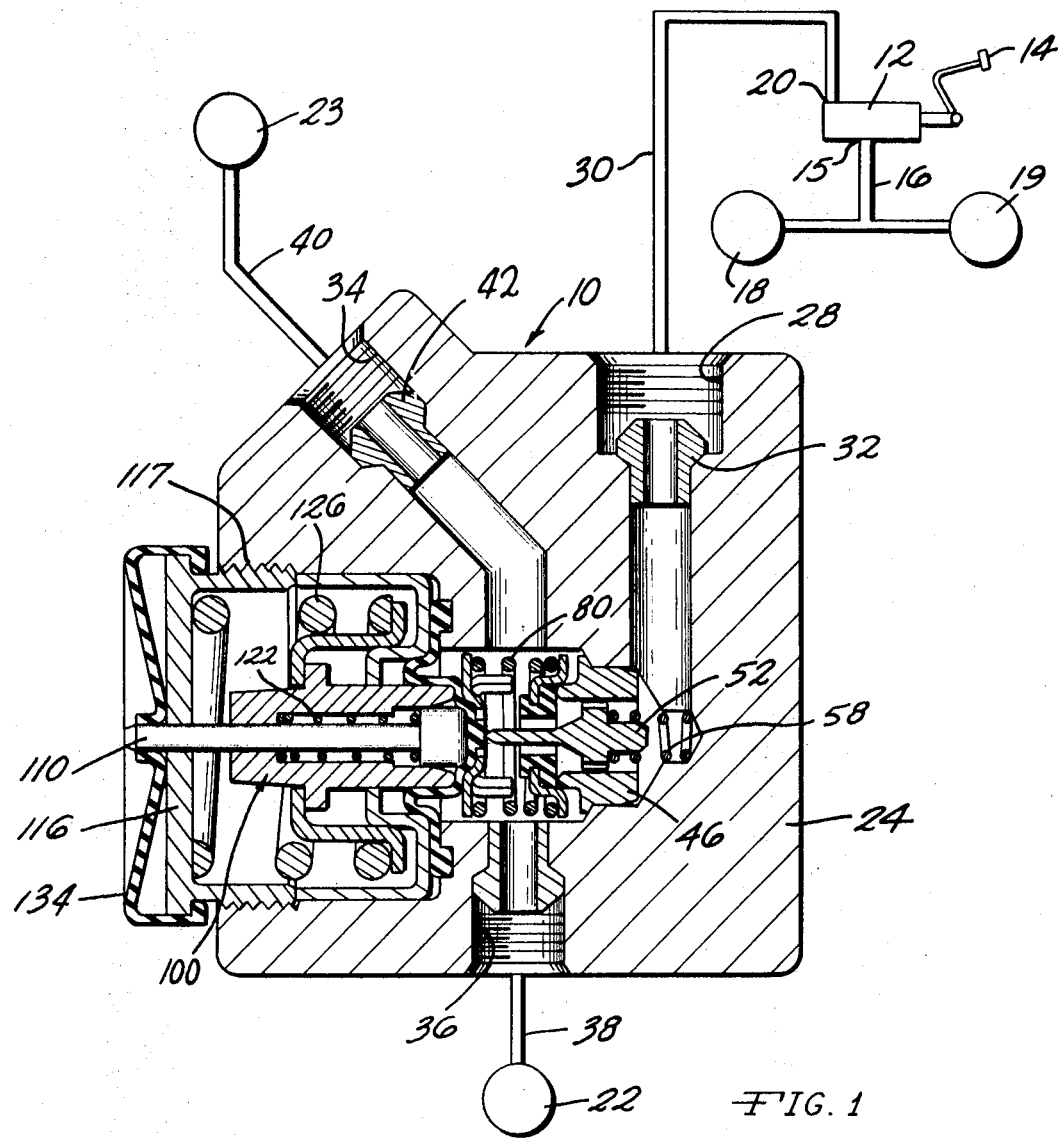
FIG. 1 is a cross-sectional view of a pressure-sensitive metering valve embodying the present invention, showing the same in association with schematically illustrated components of an automotive vehicle hydraulic brake system.

Referring to the drawings, a pressure-sensitive metering valve, generally designated 10, is illustrated embodying the present invention, the metering valve 10 having particular utility in hydraulic brake systems of automotive vehicles of the type illustrated diagrammatically in FIG. 1. In such systems, which are conventionally known as dual brake systems, hydraulic fluid is delivered from a dual master cylinder 12 actuated by a conventional brake pedal 14, a power booster (not shown) being interposed if desired between the brake pedal 14 and the master cylinder !12 to boost the manual effort applied by the driver of the vehicle. Hydraulic fluid is delivered from the outlet 15 of the dual master cylinder 12 through a line 16 to the brake actuators or wheel cylinders 18 and 19 of the drum-type brakes (not shown) provided at the rear wheels of the vehicle and hydraulic fluid is also delivered from the outlet 20 of the dual master cylinder to the brake actuators 22 and 23 of the disc-type brakes provided on the front wheels of the vehicle, the metering valve 10 being interposed between the dual master cylinder 12 and the actuators 22 and 23 of the disc-type brakes. The dual master cylinder 12 and the brake actuators 18, 19, 22 and 23 are of conventional construction and operation and their use is so well known in the art that a detailed description is not required for a full understanding of the present invention.

The pressure sensitive metering valve 10 embodying the present invention is comprised of a body 24 defining a stepped bore 26. An inlet port 28 is provided which is connected by a line 30 to the outlet 20 of the dual master cylinder 12 as illustrated diagrammatically in FIG. 1, a flare fitting such as 32 being provided at the inlet 28 of the body 24 to facilitate connection of the pressure sensitive metering valve to the line 30. As previously mentioned, the outlet 15 of the master cylinder 12 is connected to the rear wheel brake actuators 18 by the line 16. If desired, a proportioning valve of the type disclosed and claimed in the copending application of George R. Kish and Edward L. Volker and assigned to the assignee of the present invention may be interposed between the outlet 15 of the master cylinder and the rear wheel actuators 18 and 19 to limit the pressure applied to the rear wheel actuators under panic stop conditions. Such a proportioning valve has no effect on the operation of the metering valve 10. The body 24 of the metering valve 10 also includes a pair of outlet ports 34 and 36 connected to the front wheel brake actuators 22 and 23 by lines 38 and 40, respectively, the metering valve 10 thus functioning as a T-connection between the master cylinder 12 and the front wheel brake actuators 22 and 23. Flare fittings such as 42 are provided at the outlet ports 34 and 36 to facilitate connection of the lines 38 and 40 leading to the front wheel brake actuators 22 and 23.

A pressure-responsive valve assembly, generally designated 44, is provided which is adapted to control communication between the inlet port 28 and the outlet ports 34 and 36 of the metering valve 10. The valve assembly 44 is comprised of an annular valve seat member 46 which is disposed in the inner end portion 48 of the stepped bore 26 intermediate the inlet port 28 and the outlet ports 34 and 36, the valve seat member 46 having a fluidtight press fit in the portion 48 of the bore defined by the body 24. The seat member 46 defines an internal passageway 50 in which a check valve 52 is mounted for axial movement relative to the seat member 46. The central portion 54 of the check valve 52 has a sliding fit in the passageway 50, flutes 56 being provided around the periphery of the central portion 54 permitting the passage of hydraulic fluid past the central portion 54 of the check valve. A coil spring 58 is provided one end of which bears against the body 24 while the opposite end of the spring 58 bears against the central portion 54 of the check valve 52.

The check valve 52 also includes a tapered seat 60 and a reduced diameter stem portion 62 which projects through a centrally disposed passageway 64 provided in a cut-in valve 66 of annular configuration, the end 68 of the stem portion 62 of the check valve tapering to a point 70 for purposes which will be described hereinafter in greater detail. The cut-in valve 66, which is preferably formed of resilient material such as rubber, includes a pair of radially extending flange portions 72 and 74, the flange portion 74 providing a sealing surface 75 the radially outer section of which is adapted to seat against an annular rib 76 provided on the seat member 46 while the tapered portion 60 of the check valve 52 is adapted to seat against the radially inwardly disposed section of the valve surface 75.

An annular spring retainer 78 is provided the inner portion of which is disposed between the flanges 72 and 74 of the cut-in valve while the radially outer section of the retainer 78 engages one end of a coil spring 80. The other end of the spring 80 bears against a radially projecting flange portion 82 provided on a retainer element 84, the element 84 including an axially extending flange 86 which functions as a guide for the spring 80 and also functions as a stop when it is desired to bleed the valve 10.

A rolling diaphragm 88 is provided having an annular bead 90 disposed in a groove 92 defined by the body 24, the diaphragm 88 being retained in sealing engagement with the body by a retainer member 94. The diaphragm 88 is formed of resilient material such as rubber and the central portion of the diaphragm 88 is provided with an integral resilient boss 96 the surface 98 of which engages the point 70 of the stem portion of the check valve. A piston guide 100 is provided which defines an axially extending bore 102 in which is mounted a piston 104, the piston 104 including a head portion 106 the end 108 of which bears against the side of the diaphragm opposite the boss 96. The piston 104 also includes an elongate stem portion 110 which projects through a passageway 112 provided in the end portion 113 of the guide member and through an opening 114 provided in an end cap 116 the peripheral portion of which is fixed to the body 24 as by a threaded connection 117. The body portion of the guide member 100 is journaled in a bore 118 defined by a radially inwardly projecting flange portion 120 of the diaphragm retainer 94. The piston guide member is thus supported by the flange portion 120 and by the stem 110 of the piston journaled in the opening 114 in the end cap 116. A coil spring 122 is provided, one end of the spring 122 bearing against the end wall 124 of the guide member while the opposite end of the spring 122 bears against the head portion 106 of the piston. The guide member is provided with an internal shoulder 123 which functions as a stop limiting movement of the piston into the bore 102 of the guide member, and the guide member is also provided with a radially projecting flange portion 125. A coil spring 126 is provided, one end of which bears against the end cap 116 while the opposite end of the coil spring 126 bears against a radially outwardly disposed flange 128 provided on a retainer 130, the retainer 130 also including a radially inwardly projecting flange portion 132 which bears against the flange 125 provided on the piston guide member.

A boot 134 is secured to the end cap 116 by an integral flange 136, the boot surrounding the piston stem 110 and functioning to prevent dirt and other foreign material from entering the stepped bore 26 defined by the body 24.

In the operation of the metering valve 10, assuming an initial condition in which no pedal pressure is being applied to the brake pedal 14, the components of the metering valve 10 will be disposed in the positions illustrated in FIG. 1. The graph of FIG. 2 will be referred to in conjunction with the description of the operation of the metering valve to indicate the relationship between the pressure at the outlets of the master cylinder and the pressures at the ports 28, 34, and 36 as well as the port 15 leading to the drum brake equipped rear wheels. The origin or point O of FIG. 2 indicates the condition when no manual force is applied to the brake pedal 14. The dashed curve A and the solid curve B should be considered as being superimposed between the origin O and point C and also beyond the point E but are shown slightly spaced in such sections of the curves for purposes of clarity of illustration.

Figure 2:
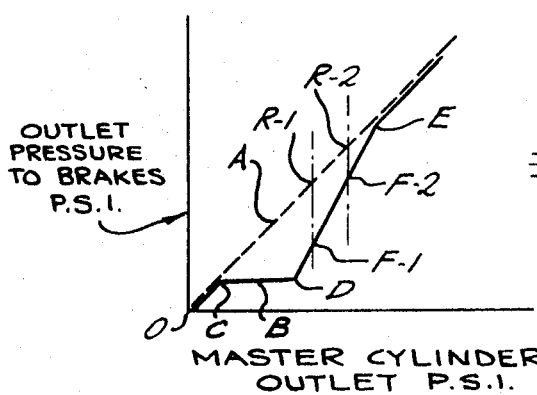
FIG. 2 is a graph illustrating the manner in which the pressure curves at the front and rear brakes are blended into a single curve by a metering valve embodying the present invention.
Figure 1A:
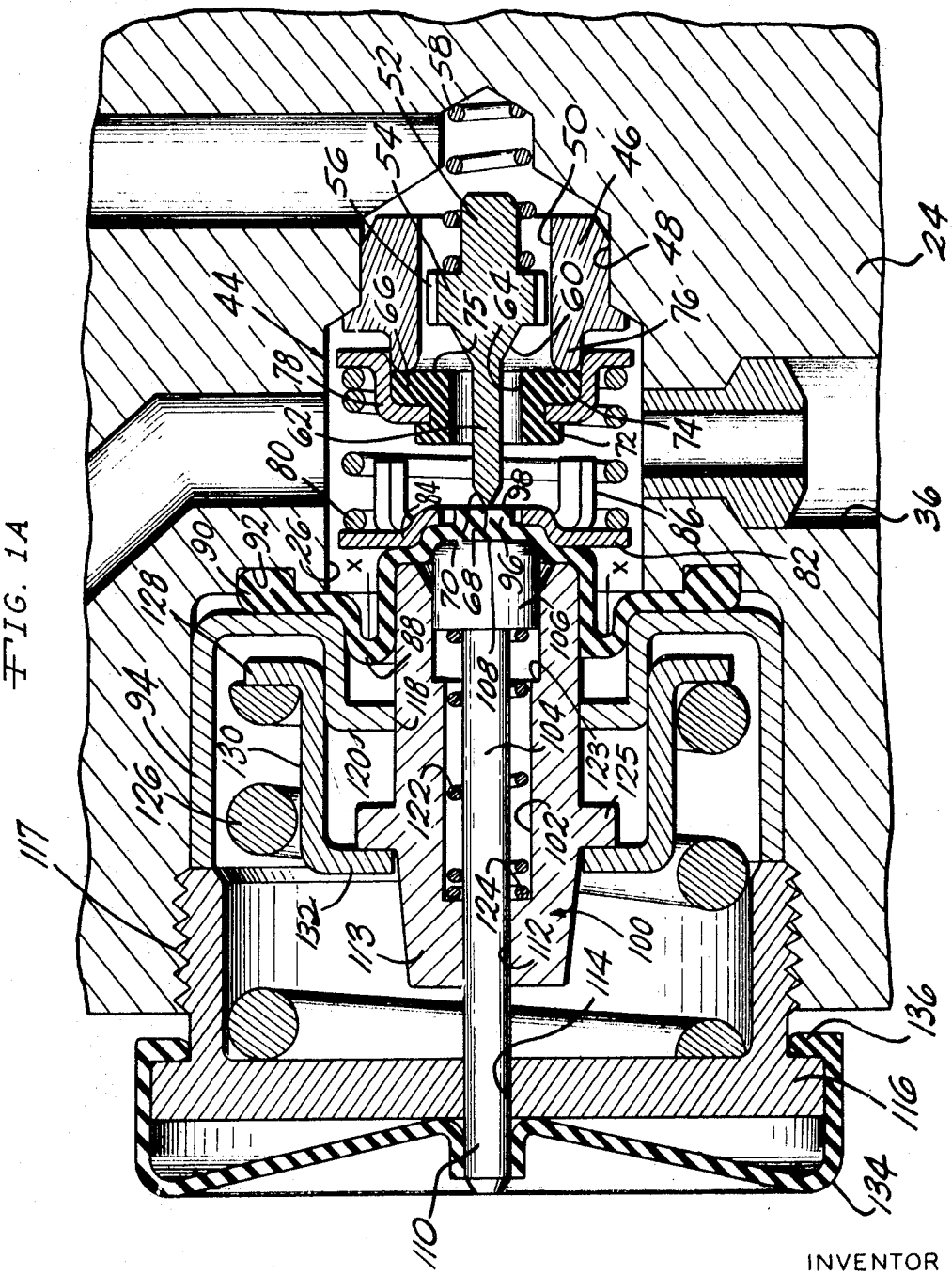
FIG. 1A is an enlarged cross-sectional view of a portion of the structure illustrated in FIG. 1.

Upon application of manual force to the brake pedal 14, the pressure from the outlet 15 will follow the curve A indicated in dashed lines to the point C so that the pressure at the outlet 15 of the master cylinder 12 is applied to the rear wheel actuating cylinders 18 and 19 through the line 16 while the pressure from the outlet 20 of the master cylinder 12 will follow the solid line B so that pressure is applied to the front wheel cylinders 22 and 23 through the metering valve 10, communication to the front wheel cylinders 22 and 23 being effected through the inlet port 28, the bore 50 of the seat member 46, the flutes 56, the bore 64 of the cut-in valve 66 to the stepped bore 26 of the body 24 and thence to the outlets 34 and 36 of the metering valve 10 and the lines 38 and 40, respectively, to the front wheel brake actuators 22 and 23. At the same time, pressure is applied to the piston 104 through the diaphragm 88, the initial effective area of the diaphragm being that determined by the cross-sectional area of the head 106 of the piston. The piston then moves into the bore 102 of the piston guide 100 against the biasing action of the spring 122 and at the same time the check valve 52 follows the movement of the piston 104 due to the biasing action of the spring 58 bearing against the central portion 54 of the check valve thereby tending to move the tapered seat 60 of the check valve into engagement with the cut-in valve 66. The sealing surface 75 of the cut-in valve remains in engagement with the rib 76 due to the biasing action of the spring 80 and the peripheral portion of the diaphragm remains substantially in the position illustrated in FIG. 1 during movement of the piston 104. Under such conditions fluid is displaced in the hydraulic brake lines so as to take up lost motion and move the disc pads to a position just touching the rotating surface to be braked and where further actuation of the disc brakes will result in braking action to the front wheels of the vehicle. Since less pressure is necessary to effect such action in the disc brakes than in the drum brakes at the rear wheels, at the point C on the graph of FIG. 2, the tapered surface 60 of the check valve seats against the adjacent surface 75 of the cut-in valve 66 thereby closing communication to the outlets 34 and 36 of the metering valve 10. As the manual force applied by the vehicle driver to the brake pedal 14 is increased, the outlet pressure of the master cylinder will continue to increase as indicated by the dashed line A in FIG. 2 and such additional pressure will be applied to the rear wheel cylinders 18 and 19 while the additional pressure generated in the master cylinder is withheld from the front wheel cylinders as indicated by the solid line B in FIG. 2. When the point D in FIG. 2 is reached, a further increase in master cylinder outlet pressure will cause the spring 80 to compress and the surface 75 of the cut-in valve 66 will lift slightly from the seat provided by the rib 76. A metered amount of fluid will then flow into the bore 26 thus increasing the pressure at the outlet ports 34 and 36. However, this fluid flow into the bore 26 will counterbalance the pressure of the opposite side of the cut-in valve and the valve surface 75 will close against the rib 76. The situation will then be as indicated at the points F-1 and R-1 of the graph illustrated in FIG. 2. That is, there will be some pressure F-1 applied at the front brakes but it will be less than the pressure R-1 at the rear brakes. Increased master cylinder pressure will again cause the cut-in valve 66 to open permitting additional fluid to flow from the inlet port 28 to the bore 26 and thus to the outlet ports 34 and 36. This will increase the pressure at the front brakes to a point such as F-2. Meanwhile the pressure at the rear brakes will reach R-2. It should be noted that the difference between F-2 and R-2 is now less than the difference between F-1 and R-1, the difference being due to the fact that the pressure in the bore 26 is increasing. Such increasing pressure in the bore 26 acts against the diaphragm 88 to exert a force on the piston guide 100 which in turn exerts a force on the spring 126 through the agency of the flange 125 and the retainer 130 so as to compress the spring 126 and move the diaphragm and piston guide to the left as viewed in FIG. 1, the effective area of the rolling diaphragm being indicated by the lines X—X in FIG. 1. Movement of the piston guide 100 and diaphragm 88 to the left, as viewed in FIG. 1, counteracts the force of the spring 126 applied to the cut-in valve 66 through the spring 80 and also tends to relax the spring 80 at the same time so that the effective forces of the springs 80 and 126 acting on the cut-in valve 66 and resisting opening movement thereof are reduced as the pressure applied at the inlet port 28 is increased and the effective forces of the springs 80 and 126 becomes less due to the relaxation of the spring 80 effected by compression of the spring 126 by the diaphragm 88 as the absolute pressure at the inlet port 28 increases. Because of the progressively increasing force on the piston guide 100 applied by the diaphragm 88 as the pressure at the inlet increases, the pressure differential between the inlet and outlet ports decreases. Finally, when the point E is reached, the valve 66 will remain open so that the pressure at the outlets 34 and 36 equals the pressure at the outlet 20 of the master cylinder 12 and the pressures at the front and rear brake actuators 18, 19, 22 and 23 are equalized. The rate of the decrease of the pressure differential being linear with constant springs 80 and 126 and the point E at which the differential disappears being determined by choosing the proper spring characteristics. By varying the relative rates of the springs 80 and 126, any desired opening point D, slope of curve B, and blend point E can be obtained.

An important advantage of the applicant's construction resides in the fact that the surface 60 of the check valve 52 remains closed against the surface 75 of the cut-in valve 66 during opening and closing movements of the cut-in valve 66 against the rib 76. This is brought about by the fact that the pointed end 70 of the valve stem portion 62 can penetrate the resilient boss 96 provided on the central portion of the diaphragm 88 so that the check valve 52 can follow the opening movement of the cut-in valve 66 even though the diaphragm 88 has not yet moved. The slope of the portion of the differential curve B between the points D and E is thus linear and constant and devoid of intermittent fluctuations present in all known prior metering valves. Moreover the metering valve 10 is solely pressure responsive and not sensitive to the rate of application of the master cylinder pressure. It should be observed that the variable pressure differential between the front and rear brakes does not necessitate the use of variable rate springs. This is because of the unique arrangement of the valve assembly components in which the springs 80 and 126 act in tandem on the valve 66 after the diaphragm 88 interposed between the springs 80 and 126 and reacting to increases in pressures to counteract the force of the spring 128 and decrease the effective forces of the springs 80 and 126 opposing opening of the cut-in valve 66.

Upon release of the brake pedal 14, the pressure at the inlet port 28 will decrease to a value lower than the pressure in the bore 26 and the differential in pressure between the bore 26 and the inlet port 28 enables the pressure in the bore 26 to unseat the check valve 52 from the cut-in valve 66 thereby permitting fluid to flow through the bore 64 of the cut-in valve 66 to the inlet port 28. The unseating of the check valve 52 thus opens the system when the brake pedal is in a released position and prevents a vacuum from building up in the system due to expansion and contraction of the system.

It should also be noted that no dynamic seals are incorporated in the metering valve 10 which are subject to atmosphere, the only seal being a static seal effected by the bead 90 of the diaphragm 88. Such a construction materially increases the life of the metering valve.

While a preferred embodiment of the invention has been illustrated and described, it will be understood that various changes and modifications may be made without departing from the spirit of the invention.

What is claimed is:

1. In a metering valve the combination including a body defining a bore, an inlet port leading to said bore, an outlet port leading from said bore, a valve seat in said bore surrounding said inlet port, a first valve in said bore having a sealing element engageable with said seat, a second valve in said bore engageable with said sealing element, a first spring urging said sealing element against said seat, pressure-responsive means in said bore supporting said first spring, said pressure-responsive means being retractable in response to increased pressure in said bore, a second spring supported at one end by said body and urging said pressure-responsive means toward said first spring, said pressure-responsive means urging said second valve away from said sealing element, whereby said first and second valves initially permit communication of fluid between said inlet port and said outlet port through bore and thereafter withhold the application of fluid pressure to said bore over a predetermined range of fluid pressure and subsequently are effective to reduce the pressure differential at a linear rate over a second range of fluid pressure.

2. The combination as set forth in claim 1, wherein said pressure-responsive means is in the form of a diaphragm.

3. In a pressure-sensitive metering valve, the combination including a body defining a bore extending inwardly from one end of said body, said body defining an inlet port connected to the inner end of said bore, said body defining an outlet port communicating with said bore, a first valve controlling the flow of fluid between said inlet port and said bore, a seat for said first valve, said seat and said first valve defining a passageway permitting the flow of fluid between said inlet port and said bore, a second valve disposed in the passageway defined by said first valve and said seat and adapted to engage said first valve in sealing relation to close said passageway, pressure-responsive means disposed in said bore in spaced relationship with respect to said first valve, a first spring disposed in said bore between said first valve and said pressure-responsive means, a second spring disposed in said bore between said pressure-responsive means and said one end of said body, both said springs opposing opening movement of said first valve, said pressure responsive means being effective to reduce the biasing force of said springs acting upon said first valve in proportion to an increase in pressure in said bore, means opposing closing movement of said second valve relative to said first valve, said pressure-responsive means being effective to overcome said last-mentioned means permitting said second valve to engage said first valve in sealing relation, and means permitting relative movement between said second valve and said pressure-responsive means.

4. The combination as set forth in claim 3, said second spring being supported at one end by said body and urging said pressure-responsive means toward said first spring whereby the pressure differential between said inlet and outlet ports decreases as a linear function in proportion to the inlet pressure and is reduced to zero at a predetermined inlet pressure.

5. The combination as set forth in claim 3, said first valve and said second valve having mutually engageable surfaces separable in response to a decrease in fluid pressure at said inlet port whereby fluid may flow from said outlet port to said inlet port through said passageway when the pressure in said bore is greater than the pressure at said inlet port.

6. In a pressure-sensitive metering valve, the combination including a body defining a bore extending inwardly from one end of said body, said body defining an inlet port communicating with the inner end of said bore, said body also defining an outlet port communicating with said bore, a first valve controlling the flow of fluid from said inlet port to said bore, a valve seat in the inner end of said bore, said first valve and said seat defining aligned passageways permitting the flow of fluid between said inlet port and said bore, a second valve disposed in the passageway defined by said seat and engageable with said first valve, a diaphragm mounted in said bore in sealed relationship with said body and in spaced relation with said first valve, a first spring disposed in said bore between said first valve and diaphragm, a second spring disposed in said bore between said diaphragm and said one end of said body, both said springs opposing opening movement of said first valve with the biasing force of said springs acting upon said first valve being reduced in proportion to an increase in pressure in said bore, piston means opposing movement of said second valve toward first valve, said diaphragm being effective to counteract said piston means and permitting said second valve to engage said first valve to close said passageways when the pressure in said bore reaches a predetermined value.

7. The combination as set forth in claim 6, said second spring being supported at one end by said body and urging said diaphragm toward said first spring whereby the pressure differential between said inlet and outlet ports decreases as a linear function in proportion to the inlet pressure and is reduced to zero at a predetermined inlet pressure.

8. The combination as set forth in claim 7, said first valve and said seat having mutually engageable surfaces separable in response to an increase in fluid pressure at said inlet port, said first valve and said second valve having mutually engageable surfaces engageable in response to an increase in fluid pressure in said bore and separable in response to a decrease in fluid pressure in said bore whereby fluid may flow from said bore to said inlet port when the pressure in said bore is greater than the pressure at said inlet port.

9. The combination as set forth in claim 8, including means permitting relative movement between said second valve and said diaphragm upon movement of said first valve relative to said seat.

10. The combination as set forth in claim 9, said second valve having a reduced diameter stem portion passing through the passageway defined by said first valve and terminating at a pointed end, said diaphragm having a resilient boss portion engageable with said pointed end of said second valve, said pointed end of said second valve penetrating said boss upon opening movement of said first valve relative to said seat whereby said second valve is maintained in engagement with said first valve upon movement of said first valve relative to said diaphragm.